UNITED STATES PATENT OFFICE.

WM. H. HOLBROOKE, OF NEW YORK, N. Y.

IMPROVED SILICATED SOAP.

Specification forming part of Letters Patent No. 34,576, dated March 4, 1862.

*To all whom it may concern:*

Be it known that I, WILLIAM H. HOLBROOKE, of the city of New York, in the State of New York, have invented a new and improved method of making a soap containing an alkaline silicate; and I do hereby declare that the following is a full and correct account or description thereof.

I take finely-ground rice-flour and reduce it, by boiling with steam, to the condition of a pulp or paste. With this I mix intimately a liquid alkaline silicate (the silicate of soda being preferred) in the proportion of about equal parts, by weight, of the solution and the rice pulp or paste. These proportions may be varied, but I prefer that I have mentioned. I then saponify an oil or fat in the ordinary way by boiling it with an alkali and water, and taking the soap so made while in a semi-fluid form and at a temperature of from 120° to 160° Fahrenheit. I mix intimately with it the compound of rice-flour and liquid silicate hereinbefore described by stirring or "crutching." In practice I prefer thus to mix or crutch together equal parts, by weight, of the saponified oil and the said composition of rice-flour and silicate of soda. The process of crutching may be done in the frame in which soap is ordinarily placed to solidify. The composition thus made may be cut and boxed in from three to five days after being placed in the frame.

In the place of rice-flour, the flour of other cereal grains or of leguminous grains and seeds may be used, or the flour of potatoes; but the rice-flour has the advantage of fineness of texture and of being a more emollient nature.

The soap made by this process is distinguished by its fineness of texture, and does not waste in use. It holds in combination a large quantity of alkali, including both that which is combined in the saponified oil and that which is combined in the liquid silicate, and is therefore highly detersive and well adapted for washing in hard water; but at the same time the alkali is so covered by the rice that it does not injuriously attack the skin or fabric to which it is applied, nor does it effloresce by exposure to the air, as less oil is required in my process. The soap thus made can be made with economy.

I do not, of course, claim any novelty in saponifying the oil or fat. I do not claim the use of an alkaline silicate as an element in soap-making. I do not claim the use of rice-flour or analogous substances in soap-making; but

I claim as my invention and desire to secure by Letters Patent—

The combining of a soluble alkaline silicate with rice-flour, or an analogous flour, by the process hereinbefore described, or its equivalent, to be used as an ingredient in soap-making.

W. H. HOLBROOKE.

Witnesses:
A. J. WILLARD,
JNO. SEDGWICK.